(12) United States Patent
Thunissen et al.

(10) Patent No.: US 7,261,371 B2
(45) Date of Patent: Aug. 28, 2007

(54) VENTILATION SYSTEM FOR AN UPHOLSTERY PART

(75) Inventors: Jan Thunissen, Wanssum (NL); Alfred Scholl, Mulheim an der Ruhr (DE); Ming Huo, Langenfeld (DE)

(73) Assignee: Johnson Controls GmbH, Burscheid (DE)

( * ) Notice: Subject to any disclaimer, the term of this patent is extended or adjusted under 35 U.S.C. 154(b) by 381 days.

(21) Appl. No.: 10/499,460

(22) PCT Filed: Dec. 10, 2002

(86) PCT No.: PCT/EP02/13972

§ 371 (c)(1), (2), (4) Date: Jun. 18, 2004

(87) PCT Pub. No.: WO03/051666

PCT Pub. Date: Jun. 26, 2003

(65) Prior Publication Data

US 2005/0082885 A1 Apr. 21, 2005

(30) Foreign Application Priority Data

Dec. 19, 2001 (DE) ............................ 201 20 516 U

(51) Int. Cl.
*A47C 7/72* (2006.01)
(52) U.S. Cl. .............................. 297/180.14; 297/452.42
(58) Field of Classification Search ................
297/180.1–180.14, 452.42, 452.43
See application file for complete search history.

(56) References Cited

U.S. PATENT DOCUMENTS

| | | |
|---|---|---|
| 374,424 A | 12/1887 | Ober |
| 390,154 A | 9/1888 | Beach |
| 1,370,832 A | 3/1921 | Mollberg |
| 1,439,681 A | 12/1922 | Alkire et al. |
| 1,475,912 A | 11/1923 | Williams |
| 1,514,329 A | 11/1924 | Metcalf |
| 1,537,460 A | 5/1925 | Campbell et al. |
| 1,593,066 A | 7/1926 | Gaston |
| 1,664,636 A | 4/1928 | Mayer |
| 1,811,829 A | 6/1931 | Folberth et al. |
| 1,837,515 A | 12/1931 | Bachrach |
| 1,936,960 A | 11/1933 | Bowman |
| 2,022,959 A | 12/1935 | Gordon |
| 2,103,553 A | 12/1937 | Reynolds |
| 2,141,271 A | 12/1938 | Gerlofson |
| 2,158,801 A | 5/1939 | Petterson |
| 2,336,089 A | 12/1943 | Gould |

(Continued)

FOREIGN PATENT DOCUMENTS

DE 2 136 947 2/1973

(Continued)

*Primary Examiner*—Anthony D. Barfield
(74) *Attorney, Agent, or Firm*—Foley & Lardner LLP

(57) ABSTRACT

A ventilation system comprises a seat, a first fan, and a second fan. The seat has an upholstery part that includes a shaped body. The shaped body has a bearing surface, a rear side opposite the bearing surface, a first opening extending generally from the bearing surface to the rear side, and a second opening. The first fan is coupled to the first opening and is configured to generate a first flow of air generally perpendicular to the bearing surface. The second fan is coupled to second opening and is configured to generate a second flow of air generally transverse to the first flow of air.

33 Claims, 4 Drawing Sheets

U.S. PATENT DOCUMENTS

| | | | |
|---|---|---|---|
| 2,493,303 A | 1/1950 | McCullough |
| 2,544,506 A | 3/1951 | Kronhaus |
| 2,703,134 A | 3/1955 | Mossor |
| 2,722,266 A | 11/1955 | Kersten |
| 2,726,658 A | 12/1955 | Chessey |
| 2,749,906 A | 6/1956 | O'Connor |
| 2,758,532 A | 8/1956 | Awe |
| 2,782,834 A | 2/1957 | Vigo |
| 2,791,956 A | 5/1957 | Guest |
| 2,826,135 A | 3/1958 | Benzick |
| 2,912,832 A | 11/1959 | Clark |
| 2,931,286 A | 4/1960 | Fry, Sr. et al. |
| 2,976,700 A | 3/1961 | Jackson |
| 2,978,972 A | 4/1961 | Hake |
| 2,992,604 A | 8/1961 | Trotmann et al. |
| 2,992,605 A | 8/1961 | Trotman et al. |
| 3,030,145 A | 4/1962 | Kottemann |
| 3,097,505 A | 7/1963 | Smith |
| 3,101,037 A | 8/1963 | Taylor |
| 3,101,660 A | 8/1963 | Taylor |
| 3,131,967 A | 5/1964 | Spaulding |
| 3,136,577 A | 6/1964 | Richard |
| 3,137,523 A | 6/1964 | Karner |
| 3,298,046 A | 1/1967 | Clementi et al. |
| 3,381,999 A | 5/1968 | Steere, Jr |
| 3,486,177 A | 12/1969 | Marshack |
| 3,506,308 A | 4/1970 | Fenton |
| 3,529,310 A | 9/1970 | Olmo |
| 3,605,145 A | 9/1971 | Graebe |
| 3,628,829 A | 12/1971 | Heilig |
| 3,638,255 A | 2/1972 | Sterrett |
| 3,681,797 A | 8/1972 | Messner |
| 3,732,944 A | 5/1973 | Kendall |
| 3,736,022 A | 5/1973 | Radke |
| 3,757,366 A | 9/1973 | Sacher |
| 3,778,851 A | 12/1973 | Howorth |
| 3,948,246 A | 4/1976 | Jenkins |
| 3,974,532 A | 8/1976 | Ecchuya |
| 4,002,108 A | 1/1977 | Drori |
| 4,043,544 A | 8/1977 | Ismer |
| 4,060,276 A | 11/1977 | Lindsay |
| 4,072,344 A | 2/1978 | Li |
| 4,141,585 A | 2/1979 | Blackman |
| 4,143,916 A | 3/1979 | Trotman et al. |
| 4,175,297 A | 11/1979 | Robbins et al. |
| 4,391,009 A | 7/1983 | Schild et al. |
| 4,413,857 A | 11/1983 | Hayashi |
| 4,509,792 A | 4/1985 | Wang |
| 4,522,447 A | 6/1985 | Snyder et al. |
| 4,589,656 A | 5/1986 | Baldwin |
| 4,673,605 A | 6/1987 | Sias et al. |
| 4,685,727 A | 8/1987 | Cremer et al. |
| 4,686,724 A | 8/1987 | Bedford |
| 4,712,832 A | 12/1987 | Antolini et al. |
| 4,719,764 A | 1/1988 | Cook |
| 4,729,598 A | 3/1988 | Hess |
| 4,847,933 A | 7/1989 | Bedford |
| 4,853,992 A | 8/1989 | Yu |
| 4,866,800 A | 9/1989 | Bedford |
| 4,923,248 A | 5/1990 | Feher |
| 4,946,220 A | 8/1990 | Wyon et al. |
| 4,980,940 A | 1/1991 | Isshiki |
| 4,981,324 A | 1/1991 | Law |
| 4,997,230 A | 3/1991 | Spitalnick |
| 5,002,336 A | 3/1991 | Feher |
| 5,004,294 A | 4/1991 | Lin |
| 5,016,302 A | 5/1991 | Yu |
| 5,079,790 A | 1/1992 | Pouch |
| 5,102,189 A | 4/1992 | Saito et al. |
| 5,106,161 A | 4/1992 | Meiller |
| 5,138,851 A | 8/1992 | Mardikian |
| 5,160,517 A | 11/1992 | Hicks et al. |
| 5,211,697 A | 5/1993 | Kienlein et al. |
| 5,226,188 A | 7/1993 | Liou |
| 5,292,577 A | 3/1994 | Van Kerrebrouck et al. |
| 5,335,381 A | 8/1994 | Chang |
| 5,354,117 A | 10/1994 | Danielson et al. |
| 5,356,205 A | 10/1994 | Calvert et al. |
| 5,370,439 A | 12/1994 | Lowe et al. |
| 5,372,402 A | 12/1994 | Kuo |
| 5,382,075 A | 1/1995 | Shih |
| 5,385,382 A | 1/1995 | Single, II et al. |
| 5,403,065 A | 4/1995 | Callerio |
| 5,408,711 A | 4/1995 | McClelland |
| 5,411,318 A | 5/1995 | Law |
| 5,416,935 A | 5/1995 | Nieh |
| 5,561,875 A | 10/1996 | Graebe |
| 5,590,428 A | 1/1997 | Roter |
| 5,597,200 A | 1/1997 | Gregory et al. |
| 5,613,729 A | 3/1997 | Summer, Jr. |
| 5,613,730 A | 3/1997 | Buie et al. |
| 5,626,386 A | 5/1997 | Lush |
| 5,626,387 A | 5/1997 | Yeh |
| 5,645,314 A | 7/1997 | Liou |
| 5,692,952 A | 12/1997 | Chih-Hung |
| 5,715,695 A | 2/1998 | Lord |
| 5,787,534 A | 8/1998 | Hargest et al. |
| 5,833,309 A | 11/1998 | Schmitz |
| 5,833,321 A | 11/1998 | Kim et al. |
| 5,850,648 A | 12/1998 | Morson |
| 5,902,014 A | 5/1999 | Dinkel et al. |
| 5,918,930 A | 7/1999 | Kawai et al. |
| 5,921,314 A | 7/1999 | Schuller et al. |
| 5,921,858 A | 7/1999 | Kawai et al. |
| 5,924,766 A | 7/1999 | Esaki et al. |
| 5,924,767 A | 7/1999 | Pietryga |
| 5,927,817 A | 7/1999 | Ekman et al. |
| 5,934,748 A | 8/1999 | Faust et al. |
| 6,003,950 A | 12/1999 | Larsson |
| 6,019,420 A | 2/2000 | Faust et al. |
| 6,048,024 A * | 4/2000 | Wallman ............... 297/180.14 |
| 6,059,018 A | 5/2000 | Yoshinori et al. |
| 6,062,641 A | 5/2000 | Suzuki et al. |
| 6,068,332 A | 5/2000 | Faust et al. |
| 6,179,706 B1 * | 1/2001 | Yoshinori et al. ...... 297/180.14 |
| 6,186,592 B1 | 2/2001 | Orizaris et al. |
| 6,189,966 B1 | 2/2001 | Faust et al. |
| 6,196,627 B1 | 3/2001 | Faust et al. |
| 6,206,465 B1 | 3/2001 | Faust et al. |
| 6,224,150 B1 | 5/2001 | Eksin et al. |
| 6,481,801 B1 * | 11/2002 | Schmale ............... 297/180.12 |
| 6,511,125 B1 | 1/2003 | Gendron |
| 6,541,737 B1 | 4/2003 | Eksin et al. |
| 6,546,578 B1 | 4/2003 | Steinmeier |
| 6,578,910 B2 | 6/2003 | Andersson et al. |
| 6,619,736 B2 * | 9/2003 | Stowe et al ........... 297/180.14 |
| 6,619,737 B2 | 9/2003 | Kunkel et al. |
| 6,626,488 B2 | 9/2003 | Pfahler |
| 6,629,724 B2 | 10/2003 | Ekern et al. |
| 6,629,725 B1 | 10/2003 | Kunkel et al. |
| 6,676,207 B2 * | 1/2004 | Rauh et al. ........... 297/180.14 |
| 6,793,016 B2 | 9/2004 | Aoki et al. |
| 2001/0035669 A1 | 11/2001 | Andersson et al. |
| 2002/0003362 A1 | 1/2002 | Kunkel et al. |
| 2002/0096915 A1 | 7/2002 | Haupt et al. |
| 2002/0096931 A1 | 7/2002 | White et al. |
| 2003/0212160 A1 | 11/2003 | Brennan et al. |
| 2003/0230913 A1 | 12/2003 | Buss et al. |

FOREIGN PATENT DOCUMENTS

| | | |
|---|---|---|
| DE | 3705756 A1 | 10/1988 |
| DE | 39 28 883 A1 | 3/1991 |
| DE | 19736951 A1 | 3/1999 |

| | | | | | | |
|---|---|---|---|---|---|---|
| DE | 19954978 | C1 | 1/2001 | FR | 2630056 A1 | 10/1989 |
| DE | 10001314 | A1 | 7/2001 | GB | 2 076 648 | 12/1981 |
| EP | 0936105 | A1 | 8/1999 | WO | WO99/50090 | 10/1999 |
| EP | 1075984 | B1 | 2/2001 | WO | WO 02/06914 A1 | 1/2002 |
| EP | 1123834 | A1 | 8/2001 | | | |
| FR | 1266925 | | 6/1961 | | | |

* cited by examiner

VENTILATION SYSTEM FOR AN UPHOLSTERY PART

CROSS-REFERENCE TO RELATED PATENT APPLICATIONS

This application is the National Stage of International Application No. PCT/EP02/13972, filed Dec. 10, 2002, which is incorporated by reference herein.

FIELD OF THE INVENTION

The present invention relates to a ventilation system for an upholstery part of a seat, a main flow of air being generated by a ventilation means essentially perpendicularly to a bearing surface.

BACKGROUND

Ventilation systems of this type are known. These are used on seat parts and/or backrests for "climatic seats". The ventilation system ensures that air flows through the upholstery part by means of an extractor fan driven by an electric motor, as a result of which a pleasant seat climate is achieved.

A disadvantage of these known ventilation systems is that, when the seat is used, the air cannot flow through an occupied contact zone between the user and the upholstery part. At the very most, the air can be sucked through the remaining free region of the upholstery part. This means that an air passage of approximately 70% based on the entire surface area of the upholstery part is closed. Due to this fact, the climatic effect of the known climatic seats, in particular the effect of conducting away moisture, is greatly impeded.

The present ventilation system is based on the object of providing a ventilation system which significantly improves the climatic effect, in particular the effect of conducting away moisture, even when a seat is occupied.

Further advantageous refinement features of the present ventilation system are hereinafter disclosed.

BRIEF DESCRIPTION OF THE DRAWINGS

The ventilation system will be explained more precisely with reference to exemplary embodiments illustrated in outlying form in the drawings, in which:

FIG. 4 shows a schematic illustration of the flow of air with a secondary flow of air blown in.

In the various figures, the parts which are identical are provided with the same reference numbers, so that they are generally only described once in each case.

DETAILED DESCRIPTION OF THE EXEMPLARY EMBODIMENTS

Figure 1:
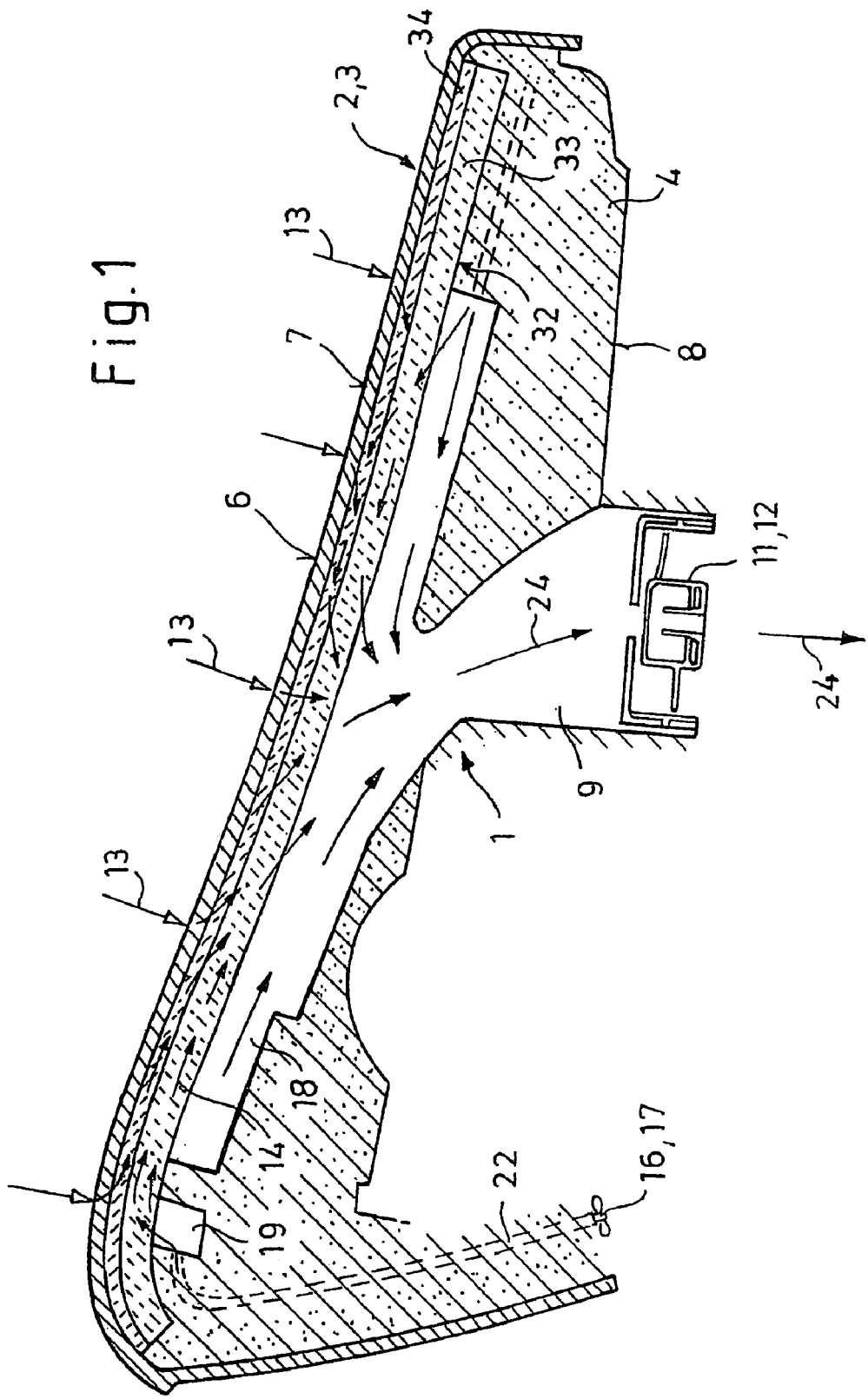
FIG. 1 shows a vertical section through an upholstery part having a ventilation system according to one exemplary embodiment.

FIG. 1 shows a ventilation system 1 in an upholstery part 2 of a seat. In the exemplary embodiment illustrated, the upholstery part 2 is designed as a seat part or cushion 3. However, the ventilation system 1 may also be arranged in an upholstery part of a backrest (not illustrated) of the seat.

The upholstery part 2 has a shaped body 4. This shaped body 4 preferably consists of a foam. The shaped body 4 is covered on its bearing surface 6 by an air-permeable covering material 7. The air-permeable covering material 7 preferably consists of a textile material, but may also consist of perforated leather or imitation leather. A connecting opening 9 open toward the bearing surface 6 and toward the rear side 8 is placed into the shaped body 4 from a rear side 8 lying opposite the bearing surface 6. A ventilation means 11 is connected on the rear side 8 to the connecting opening 9 by means of a connecting part. In this exemplary embodiment, the ventilation means 11 is designed as an extractor fan 12.

The extractor fan 12 generates a main flow of air 13 which is sucked through the air-permeable covering material 7 into the upholstery part 2 essentially perpendicularly to the bearing surface 6.

According to one exemplary embodiment, a secondary flow of air 14 is generated in the upholstery part 2 transversely to the main flow of air 13. For this purpose, use is made of an additional ventilation means 16 which is designed in this exemplary embodiment as an additional blowing fan 17.

Owing to the fact that the secondary flow of air 14 is also blown into the upholstery part 2, the closure effect of the occupied upholstery part 2 is largely eliminated.

Figure 2:
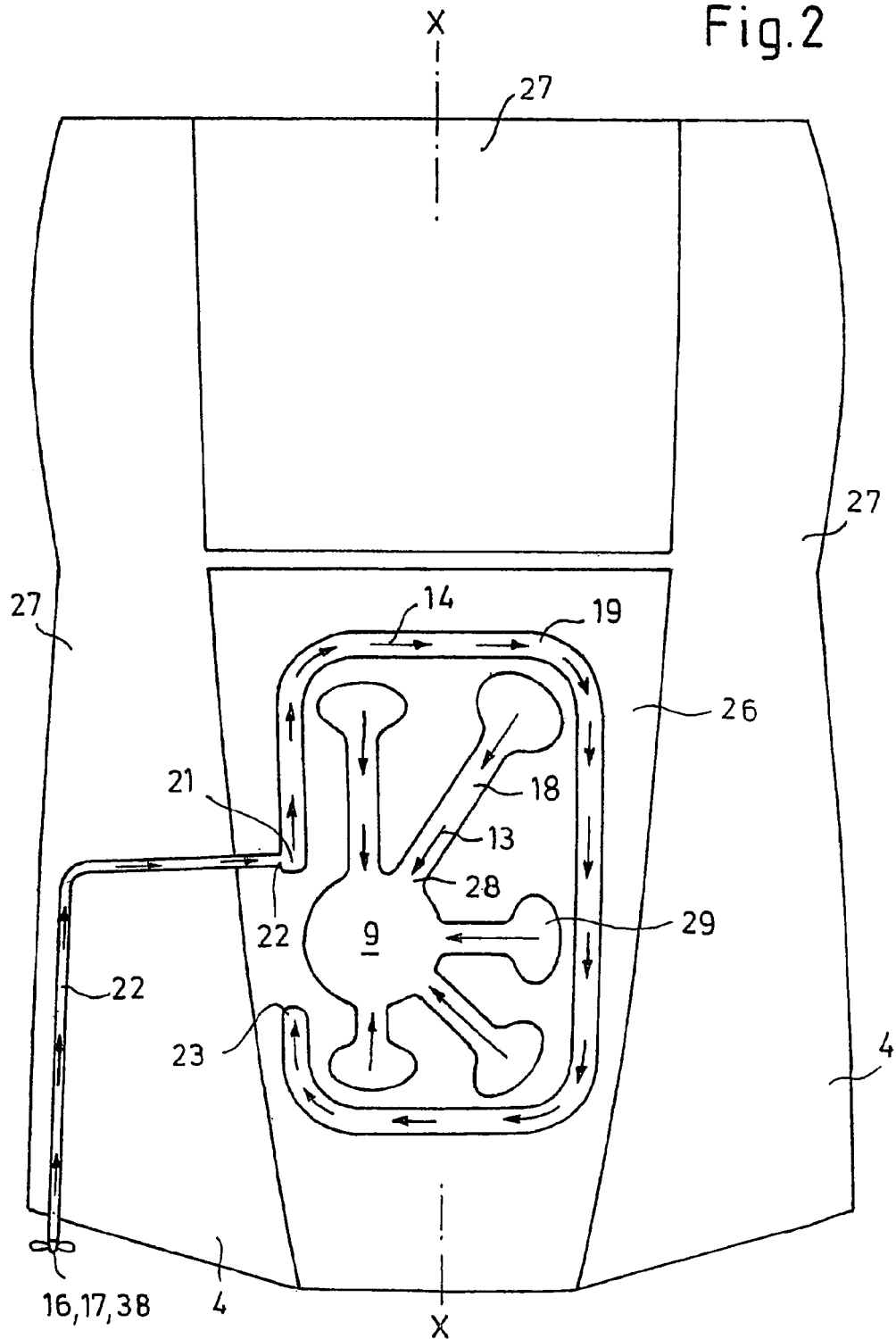
FIG. 2 shows a plan view of the ventilation system.

In the exemplary embodiment illustrated, the main flow of air 13 is conveyed in ducts 18 which are substantially surrounded by an annular duct 19 (see FIG. 2). The secondary flow of air 14 is conveyed in the annular duct 19. For this purpose, the annular duct 19 is connected at one end 21 to the blow-out side of the blowing fan 17 via a connecting opening 22. The annular duct 19 is closed at the duct end 23 lying opposite thereto. It is possible for a plurality of connecting openings to be arranged in the annular duct 19. The connecting opening 22 is guided through the shaped body 4 to the blowing fan 17. In the connecting opening 22 there may be arranged a small air pipe which ends in the transition of the connecting opening 22 to the duct ends 21 and/or 23. However, the small air pipe may also be guided further in the annular duct 19, in which case it is provided with openings which are spaced apart with respect to the bearing surface 6 for the passage of air.

The ducts 18, 19 are placed in the shaped part 4 and are open toward the bearing surface 6. As a result, the main flow of air and the secondary flow of air mix to form a single air flow 24. The annular duct 19 is placed into the shaped body 4 in the manner of a groove and has an essentially U-shaped configuration in cross section, but may also be configured in other geometrical shapes, for example it may be semicircular in cross section (see FIG. 1).

As FIG. 2 furthermore shows, the upholstery part 2 comprises a central seat surface region 26 which is surrounded by lateral and front supporting cushions 27. The ducts 18, 19 are placed in the shaped part 4 in the central seat surface region 26. In the central seat surface region 26, the connecting opening 9 is preferably offset eccentrically, i.e. laterally with respect to a central axis X—X and is arranged in the vicinity of the backrest (not illustrated).

Figure 3:
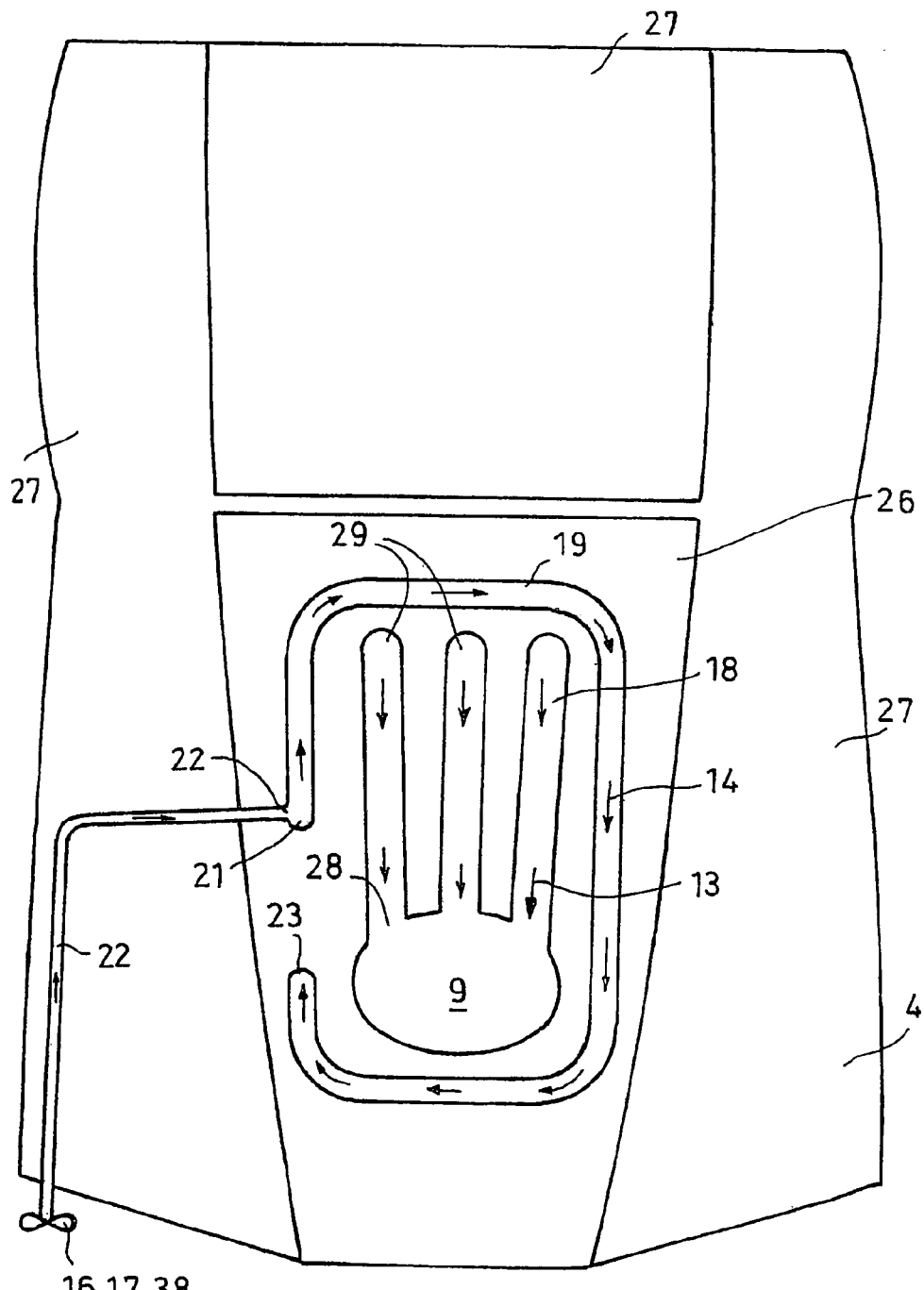
FIG. 3 shows a plan view of a different configuration of the ventilation system.

The ducts 18 are placed in the shaped part 4 in a manner such that they run in a radiated manner from the connecting opening 9, and preferably have a U-shaped configuration in cross section. They are connected at one end 28 to the connecting opening 9 and at their other end 29 are advantageously of circular or elliptical, preferably expanded design. As a result of the fact that the connecting opening 9 is not arranged in the center of the shaped part 4, the ducts 18 have different lengths, these ducts being guided in the vicinity of the annular duct 19. In a configuration illustrated in FIG. 3, the ducts 18 run essentially parallel to one another, the connecting opening 9 being arranged in the vicinity of the backrest (not illustrated).

An air-permeable intermediate layer 31 is arranged between the shaped part 4 and the air-permeable covering material 7. Starting from the shaped part 4, said intermediate layer comprises, in particular, an air-permeable, stiff plate 32, a pad 33, and a heating mat 34 (see FIG. 1).

In order to cover the ducts 18, 19 which are open toward the bearing surface 6, the shaped body 4 bears the air-permeable, stiff plate 32. The pad 33 of extremely permeable material, preferably of "rubberized hair" is placed onto the plate 32. Said pad is sealed in the edge regions of the central seat surface region 26 in relation to the shaped body 4 and the ducts 18, 19 arranged therein. This pad 33 supports the heating mat 34. The heating mat 34 preferably has, in a region in which a touching contact with the central seat surface region 26 is produced when a person sits on it, a sensory mechanism for controlling the ventilation means 11, 16, so that the ventilation means 11 and/or 16 can be switched on when a certain temperature is reached. However, a manual switching on of the ventilation means 11 and/or 16 is also advantageously possible, it being possible for the subjective response of a user to temperature to be decisive here.

Figure 4:
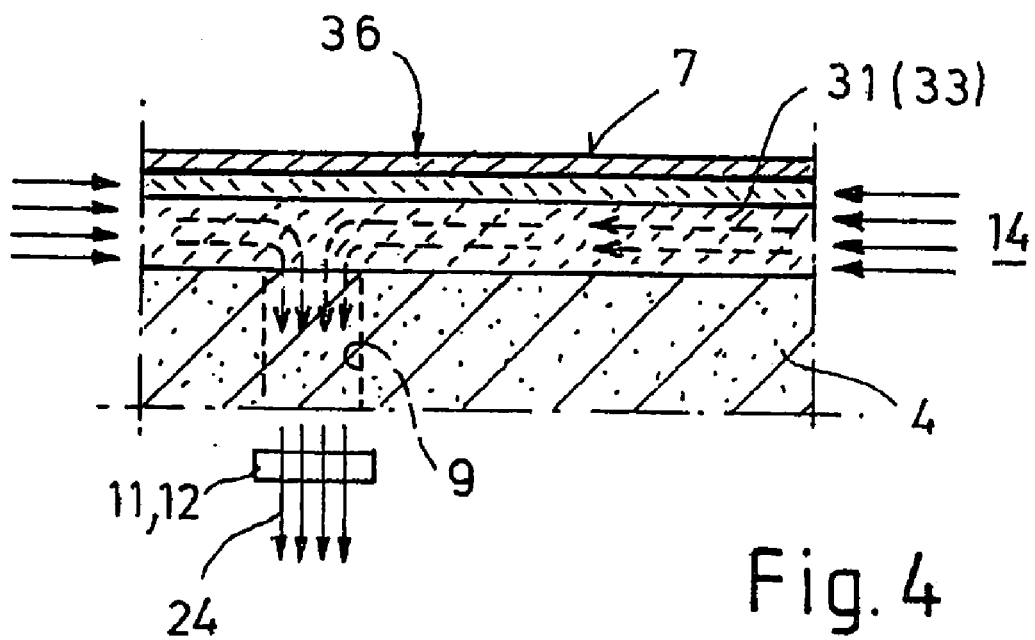
Figure 5:
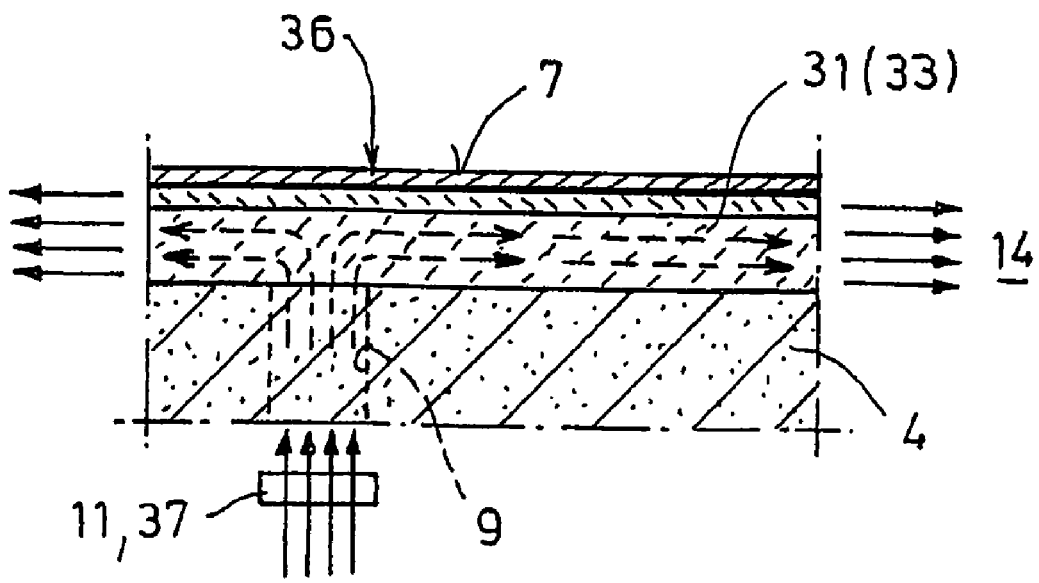
FIG. 5 shows a schematic illustration of the flow of air with a secondary flow of air being sucked out.

FIGS. 4 and 5 each illustrate a contact zone 36 of the central seat region 26, which zone is closed by a person (not illustrated) on the bearing surface 6.

As already described, the ventilation means 11 can be used as an extractor fan 12 and the additional ventilation means 16 can be used as an additional blowing fan 17. However, the ventilation means 11 may also be used as a blowing fan 37, with the additional ventilation means 16 being used as an additional extractor fan 38.

FIG. 4 illustrates the difficultly of sucking a main flow of air 13 into the upholstery part 2 through the closed contact zone 36 by means of the extractor fan 12. In order to largely eliminate this closure effect, the secondary flow of air 14 is blown via the annular duct 19 into the upholstery part 2 below the contact zone 36 by means of the additional blowing fan 17. The effect advantageously achieved by this is that, in particular, the removal of moisture is improved.

By contrast, FIG. 5 illustrates that the main flow of air 13 blown by the blowing fan 37 into the upholstery part 2 cannot pass through the closed contact zone 36 into the surroundings. Owing to the fact that the annular duct 19 is connected to a suction side of the additional extractor fan 38, a flow of air is maintained which advantageously brings about the removal of moisture. As a result, a pleasant climate in the region of the contact zone 36 is likewise achieved.

According to various exemplary embodiments of the ventilation system, the improvement in the climatic effect of a seat, in particular the effect of conducting away moisture, even when a seat is occupied, is achieved by a secondary flow of air being generated in the upholstery part essentially transversely to the main flow of air. This means that the closure effect of the occupied upholstery part is substantially reduced by an additional flow of air.

According to various exemplary embodiments of the ventilation system, the main flow of air can be sucked by the ventilation means from the bearing surface to a rear side of the upholstery part lying opposite the bearing surface. For this purpose, the ventilation means is designed as an extractor fan. The secondary flow of air can be blown into the upholstery part by an additional ventilation means. The additional ventilation means is designed as a blowing fan for this purpose.

On the other hand, the main flow of air can be blown into the upholstery part by a ventilation means designed as a blowing fan in a direction from the rear side to the bearing surface. The secondary flow of air is generated by an additional ventilation means in the form of an extractor fan.

The secondary flow of air brings about, on the one hand, a substantial reduction in the closure effect and, on the other hand, an increased removal of moisture. In addition, this achieves a very good and uniform distribution of air although the seat is occupied by a user.

The climatic effect of both configurations is essentially the same, in particular with regard to the removal of moisture.

For example, in a series of tests the upholstery part was heated from 18° C. to 34° C. With the ventilation means designed as an extractor fan switched on at 34° C., the change in temperature over time was recorded. In a second test, the upholstery part was likewise heated to 34° C., with the extractor fan and the additional ventilation means used as a blowing fan having been switched on simultaneously at 34° C. in this experiment. The changes in temperature show an essentially identical profile for both series of tests.

At the same time, measurements with regard to the removal of air moisture were recorded in both tests. It has been shown here that the removal of air moisture is substantially more effective with the extractor fan and additional blowing fan switched on at the same time than with just the extractor fan on its own.

These tests were repeated for a backrest. In this case, the backrest was heated from 21° C. to 34° C. Measurements with regard to the change of temperature over time were then carried out.

The temperature decreased more rapidly on the basis of the additional blowing fan being switched on. The removal of air moisture was likewise also measured here. It can be established here that the removal of air moisture is substantially improved with the extractor fan and additional blowing fan switched on simultaneously than if it is removed just with the extractor fan.

The previously mentioned tests were also carried out for the embodiment of the ventilation system in which the ventilation means is used as the blowing fan and the additional ventilation means is used as the extractor fan. The results with regard to removal of air moisture correspond essentially to the abovementioned results.

The ventilation system is not restricted to the exemplary embodiments illustrated, but also comprises all of the variants acting in the same manner within the context of the ventilation system.

The invention claimed is:

1. A ventilation system comprising:
   a seat having an upholstery part, the upholstery part including a pad and a shaped body, the shaped body including:
   a bearing surface;
   a rear side opposite the bearing surface;
   a first opening extending generally from the bearing surface to the rear side; and
   a second opening;
   a first fan coupled to the first opening and configured to generate a first flow of air generally perpendicular to the bearing surface; and a second fan coupled to the second opening and configured to generate a second flow of air generally transverse to the first flow of air wherein the shaped body includes a first duct for conveying the first flow of air and a second duct for conveying the second flow of air, the first duct having a first end and a second end, the first end being coupled to the first opening and the second end being closed; and wherein air flows between the second duct and the first duct via the pad.

2. The ventilation system of claim 1, wherein the upholstery part is a seat cushion.

3. The ventilation system of claim 1, wherein the first fan is one of an extractor fan and a blowing fan.

4. The ventilation system of claim 3, wherein the second fan is the other one of an extractor fan and a blowing fan.

5. The ventilation system of claim 1, wherein the first fan is configured to direct the first flow of air from the bearing surface of the shaped body to the rear side of the shaped body.

6. The ventilation system of claim 5, wherein the second fan is configured to direct the second flow of air into the shaped body.

7. The ventilation system of claim 1, wherein the first fan is configured to direct the first flow of air from the rear side of the shaped body to the bearing surface of the shaped body.

8. The ventilation system of claim 7, wherein the second fan is configured to direct the second flow of air out of the shaped body.

9. The ventilation system of claim 7, wherein each of the first duct and the second duct are open toward the bearing surface of the shaped body.

10. The ventilation system of claim 9, wherein the second duct substantially surrounds the first duct.

11. The ventilation system of claim 10, wherein first opening is arranged eccentrically on the shaped body.

12. The ventilation system of claim 10, wherein the first duct includes multiple ducts, each of the multiple ducts having a first end and a second end, the first end of each of the multiple ducts being coupled to the first opening.

13. The ventilation system of claim 12, wherein each of the multiple ducts extends radially away from the first opening.

14. The ventilation system of claim 12, wherein each of the multiple ducts are parallel to one another.

15. The ventilation system of claim 12, wherein the second end of each of the multiple ducts is closed.

16. The ventilation system of claim 15, wherein the second end of at least one of the multiple ducts is expanded.

17. The ventilation system of claim 16, wherein the second end of the at least one of the multiple ducts is circular.

18. The ventilation system of claim 16, wherein the second end of the at least one of the multiple ducts is elliptical.

19. The ventilation system of claim 10, wherein the second duct is coupled to the second opening.

20. The ventilation system of claim 19, wherein the second duct includes a first end and a second end, the first end being coupled to the second opening.

21. The ventilation system of claim 20, wherein the second end of the second duct is closed.

22. The ventilation system of claim 19, wherein the upholstery part includes;

an air-permeable intermediate layer disposed proximate the bearing surface of the shaped body; and an air-permeable covering material disposed on the side of the intermediate layer opposite the shaped body.

23. The ventilation system of claim 22, wherein the air-permeable covering material is stretched onto the shaped part.

24. The ventilation system of claim 22, wherein the intermediate layer includes an air-permeable rigid plate, an air-permeable pad, and an air-permeable heating mat.

25. A ventilation system comprising:

a seat having an upholstery part, the upholstery part including a shaped body, the shaped body including;

a bearing surface;

a rear side opposite the bearing surface;

a first opening extending generally from the bearing surface to the rear side;

a second opening;

a first set of multiple ducts for conveying a first flow of air, the first set of multiple ducts being open toward the bearing surface; and a second duct for conveying a second flow of air, the second duct being open toward the bearing surface and substantially surrounding the first set of multiple ducts;

a first fan coupled to the first opening and configured to generate the first flow of air generally perpendicular to the bearing surface; and a second fan coupled to the second opening and configured to generate the second flow of air generally transverse to the first flow of air;

wherein each of the ducts of the first set of multiple ducts includes a first end and a second end, the first end of each of the ducts of the first set of multiple ducts being coupled to the first opening;

wherein each of the ducts of the first set of multiple ducts extends radially away from the first opening; and wherein each of the ducts of the first set of multiple ducts has a length, and wherein at least two of the multiple ducts have different lengths.

26. A ventilation system comprising:

a seat having an upholstery part, the upholstery part including a shaped body, the shaped body including;

a bearing surface;

a rear side opposite the bearing surface;

a first opening extending generally from the bearing surface to the rear side;

a second opening;

a first duct for conveying a first flow of air, the first duct being open toward the bearing surface; and a second duct coupled to the second opening for conveying a second flow of air, the second duct being open toward the bearing surface and substantially surrounding the first duct;

a third opening coupled to a portion of the second duct;

a first fan coupled to the first opening and configured to generate the first flow of air generally perpendicular to the bearing surface; and a second fan coupled to the second opening and configured to generate the second flow of air generally transverse to the first flow of air;

wherein the second duct includes a first end and a second end, the first end being coupled to the second opening and the second end being closed.

27. A ventilation system comprising:

a seat having an upholstery part, the upholstery part comprising:

a shaped body comprising:

a bearing surface;

a rear side opposite the bearing surface;

a first opening extending generally from the bearing surface to the rear side;

a second opening;

a first duct for conveying a first flow of air, the first duct being open toward the bearing surface; and a second duct coupled to the second opening for conveying a second flow of air, the second duct being open toward the bearing surface and substantially surrounding the first duct;

an air-permeable intermediate layer disposed proximate the bearing surface of the shaped body, the intermediate layer comprising an air-permeable rigid plate, an air-permeable pad, and an air-permeable heating mat;

an air-permeable covering material disposed on the side of the intermediate layer opposite the shaped body;

a first fan coupled to the first opening and configured to generate the first flow of air generally perpendicular to the bearing surface; and a second fan coupled to the second opening and configured to generate the second flow of air generally transverse to the first flow of air;

wherein the rigid plate of the intermediate layer is disposed proximate the bearing surface of the shaped body and covers at least a portion of the first duct and the second duct.

28. The ventilation system of claim 27, wherein the pad is disposed proximate the side of the rigid plate opposite the bearing surface of the shaped body.

29. The ventilation system of claim 28, wherein the pad comprises rubberized hair.

30. The ventilation system of claim 28, wherein the edges of the pad are sealed.

31. The ventilation system of claim 28, wherein the heating mat is disposed proximate the side of the pad opposite the rigid plate.

32. The ventilation system of claim 31, wherein the heating mat includes a sensory mechanism operatively coupled to at least one of the first fan and the second fan so as to allow the sensory mechanism to control the operation of the at least one of the first fan and the second fan.

33. The ventilation system of claim 31, wherein at least one of the first fan and the second fan is configured to be operated manually.

* * * * *